United States Patent

[11] 3,593,593

| [72] | Inventor | Kenneth Bradshaw |
| | | Clifton, England |
| [21] | Appl. No. | 884,761 |
| [22] | Filed | Dec. 12, 1969 |
| [45] | Patented | July 20, 1971 |
| [73] | Assignee | Cam Gears Limited |
| | | Hitchin, Hertfordshire, England |
| [32] | Priority | Dec. 12, 1968 |
| [33] | | Great Britain |
| [31] | | 59141/68 |

[54] RACK AND PINION ASSEMBLIES
9 Claims, 3 Drawing Figs.

[52] U.S. Cl. ........................................ 74/498,
74/422, 74/443
[51] Int. Cl. ........................................ B62d 1/20,
F16h 1/04, F16h 55/14
[50] Field of Search .......................... 74/498,
443, 422

[56] References Cited
UNITED STATES PATENTS
3,157,061  11/1964  Parker .................. 74/498

3,267,763  8/1966  Merritt .................. 74/422
FOREIGN PATENTS
976,661  12/1964  Great Britain .......... 74/498

*Primary Examiner*—Leonard H. Gerin
*Attorney*—Hill, Sherman, Meroni, Gross and Simpson ABSTRACT: Rack and pinion automotive steering gear with shock absorbing means between the rack bar and rack for damping transfer of road shocks from the rack bar to the pinion. The rack bar has a reduced diameter portion receiving a rack sleeve and shock absorbing means, such as resilient washers, are interposed between the ends of the sleeve and shoulders of the rack bar. The rack bar is preferably cylindrical, and the reduced diameter portion thereof has an eccentric axis. The rack sleeve is preferably cylindrical with an eccentric bore so located to provide a thick rack tooth wall and to position the external cylindrical sleeve surface concentric and flush with the main rack bar. The bar and sleeve are slidably supported in a spring biased yoke.

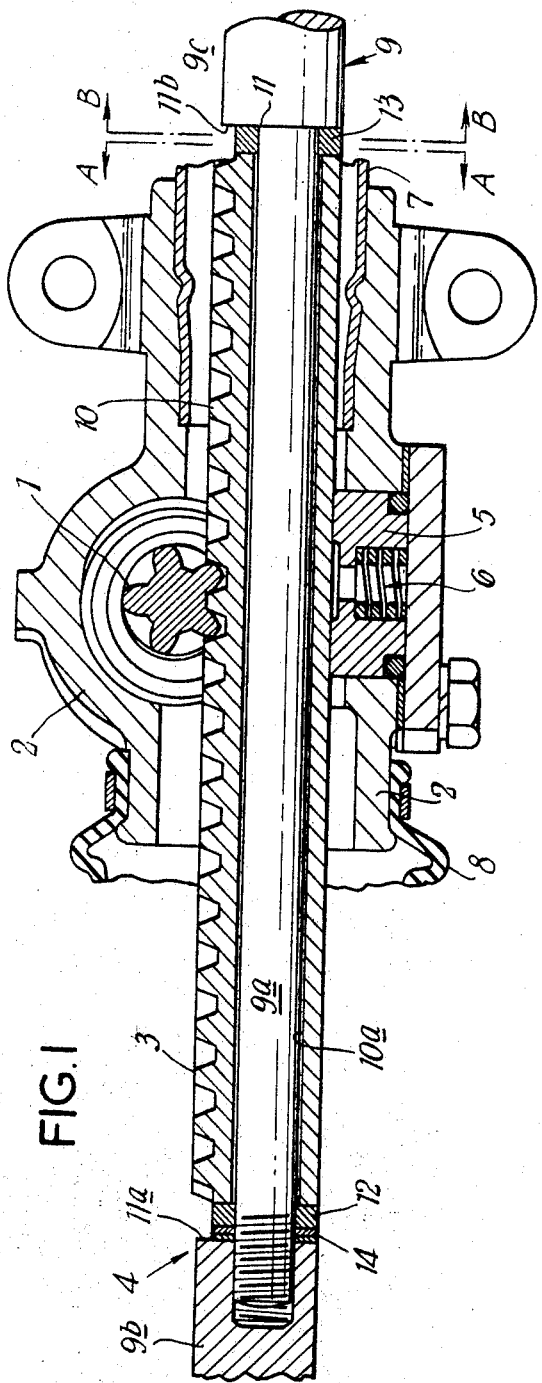
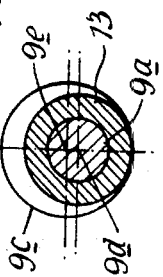
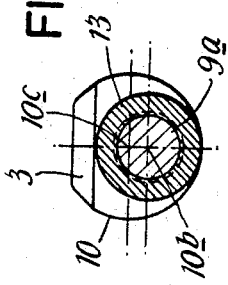
INVENTOR
Kenneth Bradshaw

RACK AND PINION ASSEMBLIES

BACKGROUND OF THE INVENTION

1. Field of the Invention

This invention relates to the art of rack and pinion steering gear for automotive vehicles wherein shock forces emanating from the road wheels are absorbed or damped before reaching the steering column. Specifically, this invention deals with the art of resiliently mounting a rack on a rack bar in a rack and pinion assembly to absorb road shocks in an efficient, economical, easy-to-manufacture construction.

2. Description of the Prior Art

Shock absorbing springs have heretofore been proposed in rack and pinion steering gear for automotive vehicles as, for example, in Cam Gears Ltd. British Pat. No. 679,958 published Sept. 24, 1952. In the rack and pinion assembly of this patent, the rack bar is in the form of a sleeve slidably receiving the rack therein, and heavy coil springs connect the rack and rack bar. The rack bar sleeve is slotted to expose the rack teeth for meshing engagement with the pinion.

SUMMARY OF THE INVENTION

The present invention now simplifies heretofore known shock absorbing mountings for rack and pinion gear. According to the present invention, a rack and pinion assembly having a pinion rotatably mounted in a pinion housing, a rack bar linearly movable in a longitudinal direction relative to the pinion housing and a rack on the rack bar meshed with the pinion so that rotation of the pinion effects longitudinal movement of the rack bar relative to the pinion housing, is equipped with shock absorbing means between the rack bar and rack.

In application of the assembly of this invention to the steering gear of a vehicle, the ends of the rack bar are connected through ball joints or the like to tie bars which, in turn, are connected to steerable road wheels of the vehicle. The pinion is rotated through the vehicle steering column in known manner. During use of such steering gear shock forces emanating from the road wheels can cause rattle of the rack bar and impart vibrations to the steering column. Supporting of the rack bar by yoke means or the like which biased the rack into engagement with the pinion in a transverse sense as, for example, in U.S. Pat. No. 3,421,387 dated Jan. 14, 1969, has not prevented feedback from road shock through the rack bar to the steering column, especially in a longitudinal sense.

According to the present invention there is provided a rack and pinion assembly of the kind specified in which the rack is provided on a sleeve and the sleeve is carried on the rack bar to be capable of restricted longitudinal sliding movement in either sense of longitudinal direction relative to the rack bar between predetermined limits. Longitudinal movement of the sleeve relative to the rack bar is damped by the action of biasing means which serve to provide progressive resistance to displacement of the sleeve in either sense of longitudinal direction from a neutral position between said limits, to which neutral position the sleeve is biased by the biasing means.

Longitudinal sliding movement of the sleeve in either sense of direction relative to the rack bar can be restricted by a pair of transversely extending and opposed abutment surfaces on the rack bar, the biasing means being located between each abutment surface and the sleeve. Preferably the rack bar is formed in two or more parts which are longitudinally connected together to define a recess within which the sleeve is carried, and the pair of abutment surfaces are provided by longitudinally opposed and transversely extending faces formed at the shoulders of the recess. The biasing mean is conveniently located between each abutment surface and the adjacent end of the sleeve.

Generally the rack bar is cylindrical and the sleeve can be substantially cylindrical and mounted on the rack bar so that the sleeve and rack bar are concentric.

The rack is preferably integrally formed with the sleeve and, to accommodate for the formation of the rack in the wall of the sleeve, the hole through the sleeve by which it is mounted on the rack bar is conveniently eccentric with the outer surface of the sleeve and the rack is formed in the thicker wall part of the sleeve. In a preferred construction the rack bar and sleeve are of cylindrical form having the same outside diameter and the sleeve is mounted in a recess formed by a reduced diameter part of the rack bar. The reduced diameter part of the rack bar is eccentric with its larger diameter parts and the bore of the sleeve is eccentric with its substantially cylindrical outer surface so that the larger diameter parts of the rack bar and the outer surface of the sleeve carried in the recess are concentric. By such a construction the combined rack bar and sleeve are substantially cylindrical and uniform in profile (which facilitates mounting the rack bar in the pinion housing) and, bearing in mind that a rack bar for a vehicle steering gear generally has an outside diameter in the order of 1 inch, the rack can be machined in the thicker wall part of the sleeve without over-weakening the sleeve.

The biasing means can be in the form of heavy springs located between the rack bar and sleeve, but preferably such means is provided through resilient pads, discs, washers or the like disposed between substantially transversely extending and longitudinally opposed surfaces of the sleeve and rack bar.

In a vehicle steering gear the rack bar is usually mounted for longitudinal movement through the pinion housing, and preferably the rack bar is spring or resiliently biased in the pinion housing in a transverse direction to urge the rack and pinion into engagement. Preferably such transverse support is incorporated in the rack and pinion assembly of the present invention so that shock forces on the rack bar in both a transverse and longitudinal direction are substantially damped out. Support for the rack bar in a transverse sense and to urge the rack and pinion into engagement is conveniently provided, as in the aforesaid U.S. Pat. No. 3,421,387.

It is then an object of this invention to provide a rack and pinion assembly suitable for use in vehicle steering gear which is relatively inexpensive to manufacture, simple in construction, and has means for absorbing shock forces applied to the rack bar in a longitudinal direction for reducing transfer of such forces to the steering column.

Another object of this invention is to provide a rack and pinion assembly for automotive steering gear wherein the rack bar has a reduced diameter portion carrying a rack sleeve and shock absorbing means are interposed between the ends of the sleeve and the rack bar.

Another object of this invention is to provide a rack and pinion assembly for automotive steering gear and the like wherein a rack bar has a longitudinally shiftable rack sleeve mounted thereon and longitudinal damping means are interposed between the sleeve and rack bar.

A specific object of this invention is to provide a rack and pinion assembly for steering gear and the like wherein a spring biased yoke slidably supports a rack bar assembly including a rack sleeve longitudinally shiftable on the rack bar and resilient shock absorbing means interposed between the sleeve and the rack bar for minimizing transfer of longitudinal shock loads from the rack bar to the pinion.

A specific object of this invention is to provide a rack bar assembly for a rack and pinion gear including a cylindrical rack bar with a reduced diameter eccentric cylindrical portion terminating in radial abutment shoulders and a rack sleeve with an eccentric bore receiving the reduced diameter portion of the rack bar and having an external cylindrical wall concentric with the rack bar wall.

Other and further objects of this invention will become apparent to those skilled in this art from the following detailed description of the annexed sheet of drawings, which, by way of a preferred example only, illustrates one embodiment of the invention.

BRIEF DESCRIPTION OF THE DRAWING

FIG. 1 is a fragmentary longitudinal cross-sectional view of a rack and pinion assembly according to this invention with parts illustrated in side elevation;

FIG. 2 is a transverse cross-sectional view taken along the line A-A of FIG. 1;

FIG. 3 is a transverse cross-sectional view taken along the line B-B of FIG. 1.

DESCRIPTION OF THE PREFERRED EMBODIMENT

The rack and pinion assembly illustrated includes a pinion 1 which operatively engages, in a pinion housing 2, with a rack 3 provided on a longitudinally extending rack bar assembly shown generally at 4. The rack bar assembly 4 is slidably supported in the pinion housing 2 for longitudinal movement therethrough by a yoke 5. The yoke 5 is slidably mounted in the pinion housing 2 and engages with the rack bar assembly on the side thereof remote from the rack 3. The yoke 5 is resiliently mounted or spring biased by means shown generally at 6 relative to the pinion housing 2 to bias the rack bar assembly 4 in a transverse direction and thereby to urge the rack 3 into engagement with the pinion 1.

As is well known in the art, during rotation of the pinion 1, the rack bar assembly 4 is moved longitudinally in either sense of direction through the pinion housing 2. In application of the rack and pinion assembly of the present embodiment to a vehicle steering gear, the pinion 1 is adapted to be coupled for rotation through a steering column and the free ends of the rack bar assembly 4 are coupled through universal couplings (not shown) to tie rods (not shown) which are adapted to be connected to the steerable road wheels of a vehicle in known manner. For use in a steering gear, the rack bar assembly 4 is housed for part of its length in a tubular housing (part of which is shown at 7) which extends from the pinion housing 2. The free end of the housing 7 is sealed to the tie rod adjacent that end by a flexible bellows (not shown). The tie rod at the end of the rack bar assembly remote from the housing 7 is sealed by a flexible bellows (part of which is shown at 8) to the pinion housing 2 so that the rack bar assembly 4 is effectively movable within a sealed chamber which is usually filled with oil.

The rack bar assembly 4 comprises a cylindrical rack bar shown generally at 9 and a substantially cylindrical sleeve 10 which is carried on the rack bar 9. The rack 3 is integrally formed on the sleeve 10. The sleeve 10 is slidably carried on the rack bar 9 to be capable of restricted movement in either sense of longitudinal direction relative to the rack bar between predetermined limits, which limits are provided by location of the sleeve within a recess 11 in the rack bar 9 so that transverse faces 11a, 11b of the recess 11 restrict the longitudinal movement of the sleeve.

The recess 11 is defined by a reduced diameter part 9a of the rack bar and the faces 11a and 11b which are respectively located on large diameter parts 9b and 9c of the rack bar 9. The sleeve 10 has a cylindrical bore 10a by which it is slidably located on the reduced diameter part 9a of the rack bar.

So that the sleeve 10 can be located on the reduced diameter part 9a of the rack bar 9, the rack bar 9 is conveniently made in two parts which are longitudinally connected together to define the recess 11. The reduced diameter part 9a is machined integral with the cylindrical part 9c, and the free end of the reduced diameter part is externally screw threaded and engages with a complementary internal screw thread provided in the end of the cylindrical part 9b. It will be apparent that with the cylindrical parts 9b and 9a disconnected, the sleeve 10 (together with the biasing means, as will hereinafter be described) can be slipped over the reduced diameter part 9a, and thereafter the parts 9b and 9a can be screwed into engagement to retain the sleeve in the recess 11.

The cylindrical parts 9a, 9b and 9c can be coaxial if required. However, in the present embodiment, the reduced diameter part 9a of the rack bar 9 has an axis 9d and (as will be seen from FIG. 3) the reduced diameter part 9a and the larger diameter part 9c (having an axis 9e) are eccentric. The screw engagement between the parts 9a and 9b is eccentric with the part 9a so that the cylindrical profiles of the parts 9b and 9c, when engaged, are concentric. Further, the bore 10a (having an axis 10b) of the sleeve and the outer substantially cylindrical surface of the sleeve (having an axis 10c) are eccentric and the rack 3 is machined in the thicker wall part of the sleeve 10 (see FIG. 2). By the eccentric arrangement the sleeve 10 when mounted has its cylindrical profile concentric with the larger diameter parts 9b and 9c of the rack bar and sufficient wall thickness can be provided on the sleeve for the machining of the rack 3.

As above mentioned, the sleeve 10 is slidable on the smaller diameter part 9a of the rack bar within the recess 11 and such movement is restricted by the transversely extending opposed faces 11a and 11a formed on the shoulders of the recess 11. Mounted on the smaller diameter part 9a of the rack bar 9 and located one between each face 11a, 11b and the adjacent end of the sleeve 10 are two resilient pads which are conveniently in the form of polyurethane washers 12 and 13. The washers 12 and 13 bias the sleeve relative to the rack bar to a neutral position between the faces 11a, 11b and provide progressive resistance to displacement of the sleeve in either sense of longitudinal direction from the neutral position. By such an arrangement it will be apparent that if shock forces are applied to the rack bar 9 in a longitudinal direction, a proportion of such forces is absorbed by the resilient washers so that the reaction through the pinion 1 is considerably reduced in comparison with similar shock forces being applied to a rack and pinion assembly in which the rack 3 is integrally formed with the rack bar 9.

It is to be realized that the resilient medium of the washers 12, 13 can be provided by, for example, natural or synthetic rubbers or a suitable plastics material other than polyurethane.

Packing shims or the like (as, for example, shown at 14 in FIG. 1) can be situated on the reduced diameter part 9a between either or both of the faces 11a, 11b and the adjacent end faces of the sleeve 10.

The use of packing shims may be particularly necessary in a construction similar to that above described and illustrated in which, after screw engagement between the parts 9a and 9b, the part 9b is fixedly secured to the part 9a by, for example, a locking pin or screw (not shown) to provide a fixed spacing between the faces 11a, 11b, at which spacing the parts 9b and 9c are concentric and the shims permit slight variations in the lengths of the sleeve 10 and washers to be accommodated.

The rack and pinion assembly above described and illustrated can be modified by replacement of the resilient washers 12, 13 by metallic spring members in the form of, for example, helical springs, Belville washers or the like which are similarly mounted on the reduced diameter part 9a.

I claim as my invention:

1. A rack and pinion assembly comprising a housing, a rack bar slidably mounted in said housing, a rack sleeve on said rack bar, a pinion meshed with said rack sleeve, and shock absorbing means between the sleeve and rack bar for damping transfer of shock forces from the rack bar to the pinion.

2. A rack and pinion assembly for automotive steering gear which comprises a housing, a rack bar longitudinally slidable in said housing, a pinion rotatably mounted in said housing, a rack sleeve on the rack bar meshed with said pinion, spring biased yoke means urging said sleeve toward said pinion for maintaining the rack and pinion teeth in meshed engagement, and resilient means between the ends of said sleeve and said rack bar for damping transfer of longitudinal shock forces from the rack bar to the pinion.

3. The rack and pinion assembly of claim 1 wherein said shock absorbing means provide a bias of progressive resistance to displacement of the sleeve in either sense of longitudinal direction from a neutral position on the rack bar.

4. The rack and pinion assembly of claim 1 wherein the rack bar has a reduced diameter portion receiving said sleeve and the shock absorbing means are interposed between the ends of the sleeve and the ends of the reduced diameter portion.

5. The rack and pinion assembly of claim 1 wherein the shock absorbing means are resilient washers interposed between the ends of the sleeve and abutments on the rack bar.

6. The rack and pinion assembly of claim 2 wherein the rack bar has a plurality of longitudinally connected parts together defining a recess in which the sleeve is carried.

7. The rack and pinion assembly of claim 2 wherein the rack bar and the sleeve are cylindrical and so related as to provide concentric external surfaces slidably mounted in the housing.

8. A rack and pinion assembly comprising a housing, a cylindrical rack bar slidable longitudinally in said housing, said rack bar having an elongated recess provided by a reduced diameter portion eccentric with the larger diameter portion of the rack bar, a rack sleeve having an external substantially cylindrical surface and an eccentric bore receiving said reduced diameter portion of the rack bar, said rack sleeve having a rack located in the thicker walled part thereof and the eccentric bore of the sleeve coacting with the eccentric reduced diameter portion of the rack bar to provide an external cylindrical surface of the sleeve and the larger diameter portions of the rack bar which are substantially concentric, a pinion rotatably mounted in said housing meshed with the teeth of the rack sleeve, and a spring biased yoke in the housing slidably receiving the sleeve and rack bar therethrough for urging the rack teeth against the pinion teeth.

9. The rack and pinion assembly of claim 8 wherein the reduced diameter portion has radial end shoulders and shock absorbing means are interposed between the ends of the sleeve and said shoulders.